United States Patent [19]

Gossett

[11] Patent Number: 5,267,040
[45] Date of Patent: Nov. 30, 1993

[54] STRUCTURE AND METHOD FOR DETECTING PHASE ERRORS IN THE HORIZONTAL SYNCHRONIZATION PULSES OF TELEVISION SIGNALS

[76] Inventor: C. Philip Gossett, 1169 Burgoyne, Mountain View, Calif. 94043

[21] Appl. No.: 803,263

[22] Filed: Dec. 3, 1991

Related U.S. Application Data

[63] Continuation-in-part of Ser. No. 678,559, Mar. 28, 1991.

[51] Int. Cl.$^5$ ............................................. H04N 5/04
[52] U.S. Cl. ........................ 358/148; 358/158; 358/319
[58] Field of Search .................. 358/17, 19, 148, 149, 358/158, 339, 324, 319

[56] References Cited

U.S. PATENT DOCUMENTS

| | | | |
|---|---|---|---|
| 4,498,103 | 2/1985 | Aschwanden | 358/149 |
| 4,672,448 | 6/1987 | Gioiosa | 358/148 |
| 4,679,005 | 7/1987 | Tatami | 358/158 |
| 4,680,621 | 7/1987 | Baker et al. | 358/17 |
| 4,791,488 | 12/1988 | Fukazawa et al. | 358/149 |
| 4,847,678 | 7/1989 | McCauley | 358/149 |
| 5,157,492 | 10/1992 | Tults | 358/148 |

Primary Examiner—James J. Groody
Assistant Examiner—Jeffrey S. Murrell
Attorney, Agent, or Firm—Skjerven, Morrill, MacPherson, Franklin & Friel

[57] ABSTRACT

A method and a structure are provided to detect phase errors in horizontal synchronization pulses of video signals. A detected phase error is used to provide a phase correction for each horizontal line of the video image. In one embodiment, the phase correction is provided by a digital filter which takes into account systematic and random components of the phase error. In addition, the phase correction also takes into account accumulated round-off errors in the digital filter itself. A random number generator in the digital filter randomizes the correction for accumulated round-off errors. The phase correction is made smaller than the phase error so as to prevent jittering in the resulting picture.

16 Claims, 5 Drawing Sheets

STRUCTURE AND METHOD FOR DETECTING PHASE ERRORS IN THE HORIZONTAL SYNCHRONIZATION PULSES OF TELEVISION SIGNALS

CROSS REFERENCE TO RELATED APPLICATION

The present application is a continuation-in-part application of U.S. patent application entitled "Structure and Method for Digital Demodulation of Television Signals," by C. Philip Gossett, Ser. No. 07/678,559, filed Mar. 28, 1991, hereby incorporated by reference in its entirety.

FIELD OF THE INVENTION

The present invention relates to signal processing, and in particular relates to the processing of television signals.

BACKGROUND OF THE INVENTION

In NTSC, PAL or a similar television signal, two synchronization "pulses" are provided for synchronization at the receiving unit. One pulse, known as the "vertical synchronization pulse," indicates the beginning of a field[1]. The other pulse, known as the "horizontal synchronization pulse" indicates the beginning of a horizontal line. By tracking these pulses, the receiving unit is provided a time basis to align the image from field to field, and from line to line.

[1] In NTSC or PAL television signals, the image is made up of two interlacing fields. The odd field is formed by the odd horizontal lines and the even field is formed by the even horizontal lines. The fields are provided alternately.

In addition to broadcast television, television signals are received from many sources, including cable television, video cassette recorders (VCRs), and laser disk players. (Television signals are also referred to as video signals.) However, the reliability as a time basis in a video signal received from any one of these sources varies with the technology used at the source. In particular, broadcast television provides the most reliable time basis. By contrast, a video signal from a VCR may provide synchronization pulses which locations vary over a relative large range, thereby making the task of tracking such video signal relatively difficult.

In a VCR, the video signal is recorded and replayed by two or more magnetic heads driven by a servomechanism. Typically, the servo-mechanism is designed such that a magnetic head is in contact with the advancing magnetic tape to record or replay the video signal. During recording, the video signal is recorded on the magnetic tape by the magnetic head then in contact with the magnetic tape. Since the magnetic head scans the magnetic tape in a helical manner, the television is recorded as diagonal tracks on the magnetic tape, with each track containing a field of the video signal.

A typical VCR is designed such that, whether recording or replaying, as soon as the magnetic head in contact with the magnetic tape traverses of the width of the magnetic tape, another magnetic head comes into contact to record the next field of video signal. Both the servomechanism and the magnetic tape contribute to the variability in the video signal provided by a VCR. In a VCR, a transient vibration is often caused at the beginning of each field by a magnetic head coming into contact with the magnetic tape. This transient vibration often lasts up to the duration of 25 horizontal lines. In addition, because of the variability inherent in the servomechanism, there are also variations in the time intervals between horizontal lines.

FIG. 1 shows the waveform 100 of a video signal under NTSC in the immediate vicinity of the horizontal synchronization pulse 102. FIG. 1 shows section 101, which encodes the picture elements ("pixels") at the end of the immediately preceding line, preceding horizontal synchronization pulse 102.

Horizontal synchronization pulse 102 comprises three waveform sections 102a, 102b and 102c. Waveform section 102a, having a duration of 1.5 microseconds (uS), is at a signal level known as the "blanking level." Waveform section 102b, having a duration of 4.7 uS, is at a signal level known as the "sync level." Thereafter, the signal returns to the blanking level (waveform 102c), before providing a burst 103 of the color subcarrier to allow the receiving circuit to synchronize to the phase of the color component of the video signal.

One method for a receiving circuit to synchronize with the television signal is by detecting the mid-point of the falling edge in the horizontal synchronization pulse, i.e. point 104 of waveform 100. A deviation from the expected location in time of this horizontal synchronization pulse is termed a horizontal phase error, or simply a phase error.

SUMMARY OF THE INVENTION

In accordance with the present invention, a method and a structure are provided for synchronizing horizontal lines in a video image. In one embodiment, two modes of operation are provided. In one mode ("fine lock" mode), the horizontal synchronization pulse is assured to have a fixed phase relationship with the color burst reference. In the other operation mode ("VCR mode"), a phase detector estimates a phase error by summing, for each horizontal line, samples of a video signal over a predetermined window containing a transition of the horizontal synchronization pulse. A multi-pixel phase correction chosen to be smaller than the phase error is then provided for phase compensation. In the present embodiment, the phase correction includes corrections for systematic and random phase errors. In addition, accumulated errors due to round-off in the phase correction circuit are also corrected. A random number generator randomizes the correction for accumulated errors to minimize periodicity in such phase correction.

In one embodiment, the VCR mode is applied only to a predetermined number of horizontal lines following the horizontal synchronization pulse. The remaining horizontal lines are processed under fine lock mode.

The present invention provides a multi-pixel phase correction in the receiving circuit based on a video signal received from a video source which provides an unreliable time basis. In an application using video signals from a VCR, the multiphase phase correction provides phase compensation in the first 25 or so horizontal lines of a field, so as to compensate for discontinuities due to magnetic head switching at the VCR between fields.

In addition, the present invention provides a phase correction smaller than the estimated phase error so as to prevent jittering in the resulting image due to the phase correction's responses to random phase errors.

The present invention is better understood upon consideration of the following detailed description and the accompanying drawings.

DETAILED DESCRIPTION OF THE PREFERRED EMBODIMENTS

An embodiment of the present invention is implemented in the video processor of the Frox Entertainment System, which is available from Frox, Inc., Santa Clara, Calif. The Frox Entertainment system, including the video processor, is controlled by a microprocessor. An overview of the Frox Entertainment System can be found in copending application Ser. No. 07/666,766, entitled "Image Blending and Video Deinterlacing Techniques" by C. Philip Gossett, filed Mar. 8, 1991, which is hereby incorporated by reference in its entirety.

In the present embodiment, the television signal is sampled from the video source at a sampling rate of four times the frequency of the color subcarrier signal. For NTSC television signals, the color subcarrier signal is provided at 3.58 MHz. Thus, the digitized video signal of the present embodiment is provided at a rate of approximately 14.32 MHz. Ideally, at this sampling rate, each horizontal line provides 910 picture elements (pixels).

When the source of the video signal is broadcast television, it is found that the phase error from field to field (i.e. the alignment error between two adjacent horizontal lines, which are provided by different fields in the video signal) does not exceed one pixel. However, in a video signal provided in a VCR, the phase errors can be tens of pixels. Hence, as discussed in the following, the present embodiment distinguishes between a high quality time basis, such as a video signal from broadcast television, and a low quality time basis, such as a video signal from a VCR.

Figure 1:
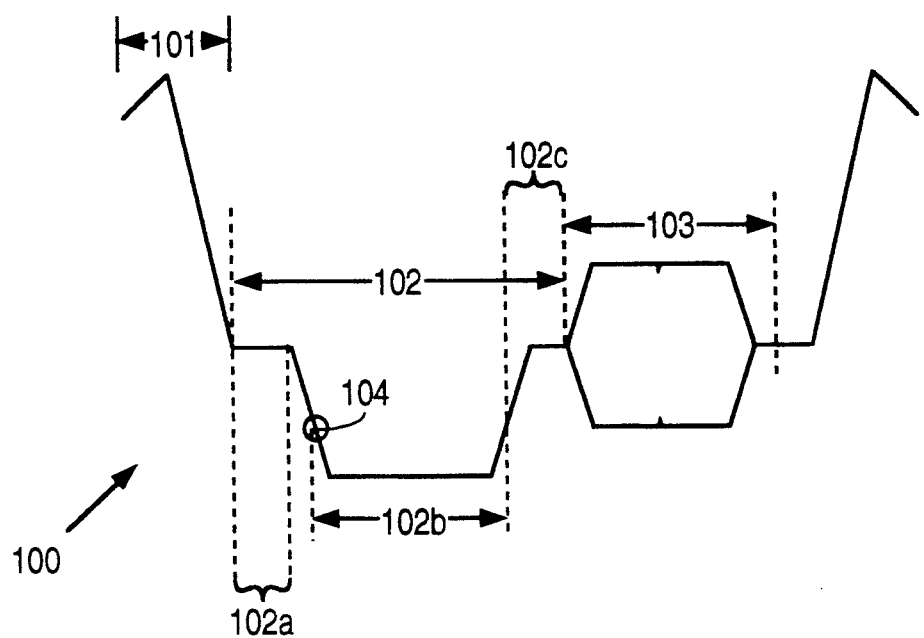
FIG. 1 shows a waveform 100 of a television signal in the immediate vicinity of the horizontal synchronization pulse 102.
Figure 2:
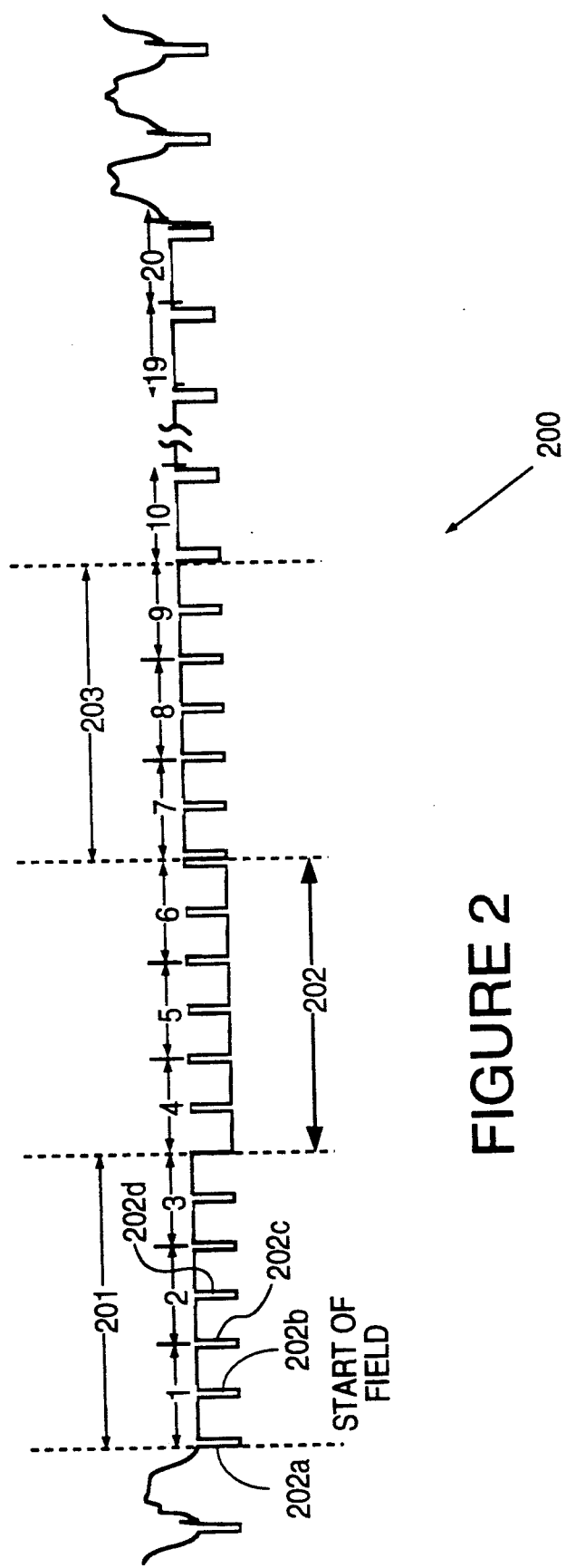
FIG. 2 shows a waveform 200 of a television signal in the immediate vicinity of the vertical synchronization pulse.

FIG. 2 shows the waveform 200 including a vertical synchronization pulse. As shown in FIG. 2, The beginning of the field is indicated by the preequalization pulse interval 201, which is provided at a reference blanking level. The preequalization pulse interval 201 is followed by the vertical synchronization pulse 202, which is provided at the "sync" level. The vertical synchronization pulse is then followed by the postequalization pulse interval 203. The serration pulses, i.e. waveform 202a-202d, are provided at twice the frequency of the horizontal lines. In the present embodiment, a noise gate samples the television signal at 8- or 9-pixel intervals. The 8-pixel intervals and the 9-pixel intervals are interspersed to form a 104 approximately equally spaced windows. To prevent erroneous detection of the vertical synchronization pulse due to either an excursion of the color subcarrier signal into the sync level or a noise glitch, the vertical synchronization pulse is considered detected only after thirteen of the sixteen consecutive samples are found to be at the sync level. Another noise gate detects the duration of the vertical synchronization pulse, which is approximately three horizontal lines wide in NTSC television.

Upon detection of the vertical synchronization pulse, the counters related to the timing of the present field are reset. Such counters include the current horizontal line counter which keeps track of the number of horizontal line received. In NTSC television, the number of lines received between vertical synchronization pulses is 262.5 lines. When a horizontal synchronization pulse is detected, counters related to the timing of the horizontal line are incremented or decremented for receiving the nominal 910 pixels. Such counters include a current pixel counter which keeps track of the pixels received in the current horizontal line. At the sampling rate of the present embodiment, the width of a horizontal synchronization pulse of an NTSC video signal is approximately the duration of seventy pixels.

In this embodiment, when the video signal is received from a high quality time basis (i.e. a source other than a VCR), the microprocessor sets the video processor in a first mode of operation ("fine lock" mode). In fine lock mode, a phase detector in a phase-locked loop drives a voltage-controlled crystal oscillator so as to "lock" the phase-locked loop onto the color burst. For a high quality time basis, there are exactly 910 pixels sampled at four times the color subcarrier frequency. Since no phase error between the horizontal synchronization pulse and the color burst is expected in the high quality time basis, any initial phase error (e.g. due to channel switching) can be corrected by either increasing or decreasing the current horizontal line by one pixel. Such correction is provided by doubling the count increment or freezing the current count in the current pixel counter appropriately for the duration of the current pixel. To prevent jitter resulting from random noise in the video signal, phase correction is limited to only take effect when the synchronization pulse detector indicates an error of 2, 4, or 8 pixels in the horizontal line. The phase-locked loop, including the phase detector and the voltage-controlled crystal oscillator, can be provided conventionally.

Figure 3:
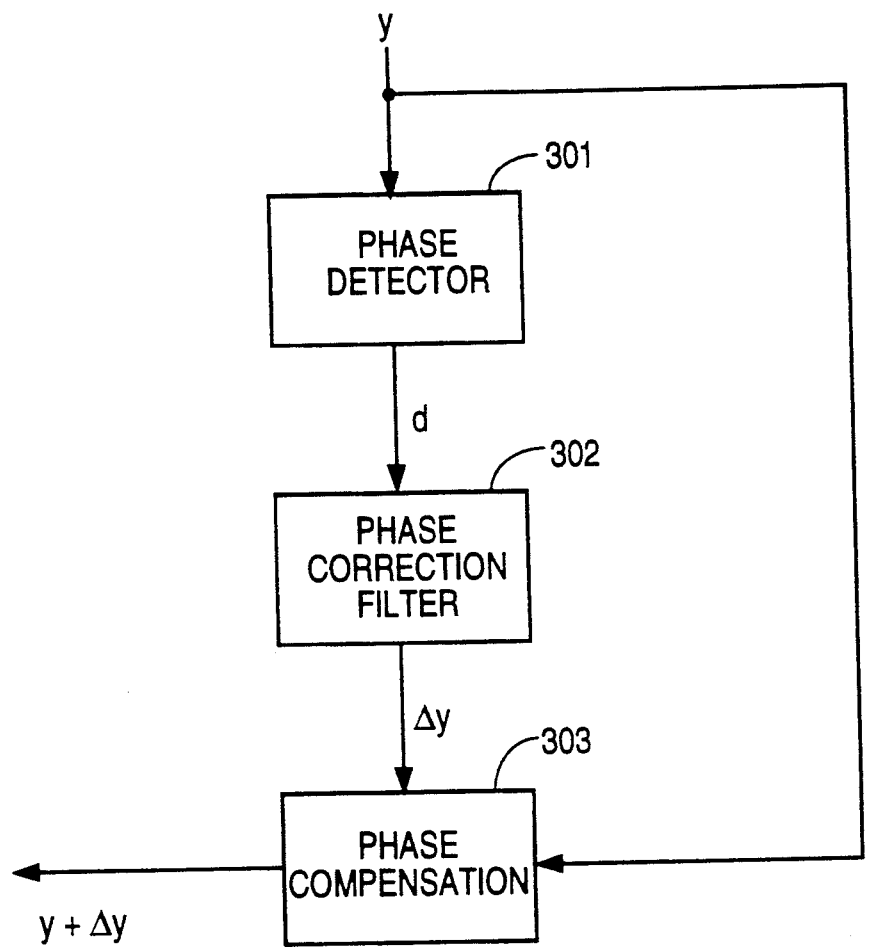
FIG. 3 is a block diagram of an embodiment of the present invention.

When the source of the video signal is from a VCR, however, the microprocessor sets the video processor into a second mode of operation. Under this second mode, the video processor corrects phase errors in the first 25 horizontal lines. Thereafter, the video processor is set to fine lock mode until the next field is received. FIG. 3 is a block diagram of a circuit 300 for correcting such phase errors, i.e., circuit 300 is active during the first 25 horizontal lines of each field.

As shown in FIG. 3, circuit 300 comprises a phase detection circuit 301, a phase correction filter 302, and a phase compensation circuit 303. Phase detection circuit 301 estimates the phase error of the current horizontal line. As mentioned above, phase error is the difference between the expected location of the horizontal synchronization pulse and the location of the horizontal synchronization pulse actually received. Based on this phase error, phase correction filter 302 determines the number pixels ("phase error") which the current horizontal line lags or leads its expected phase, measured with respect to the previous horizontal line in the same field. Phase compensation circuit 303 compensates for this phase error by either doubling the count increment received by the current pixel counter, or freezing the current pixel counter, so as to appropriately advance or delay the pixels of the digitized video signal received in the current horizontal line. For example, if the current video signal lags the previous horizontal line by 8 pixels, then the count increments of the current pixel counter is doubled for the duration of next eight pixels. Alternatively, if the current video signal leads its expected phase by 8 pixels, then the current pixel counter is frozen for 8 pixels.

Figure 4:
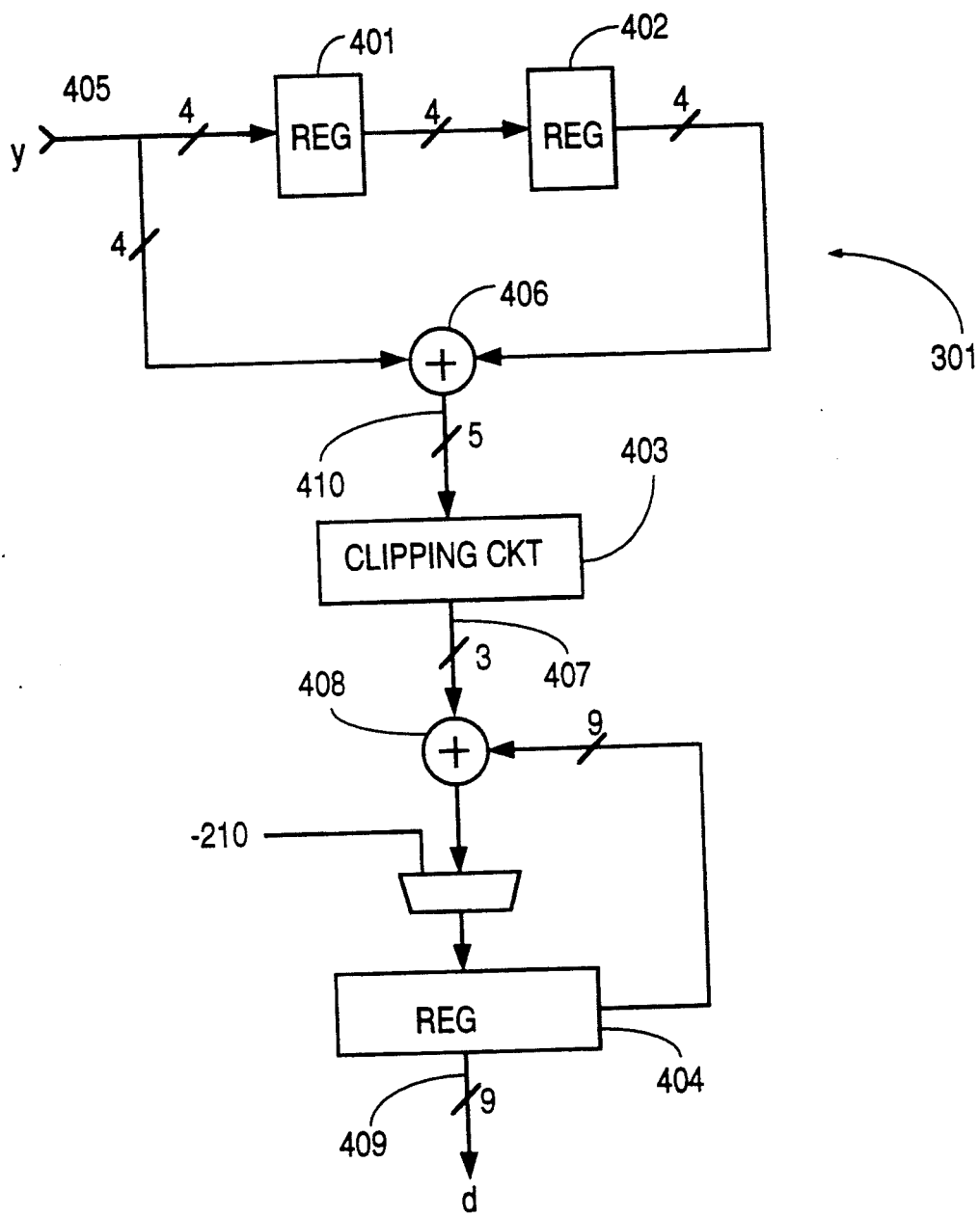
FIG. 4 shows a phase detection circuit 301, in accordance with the present invention.

Phase detection circuit 301 is shown in FIG. 4. Phase detection is provided by summing the sampled pixel value over a 70-pixel window ("detection window") nominally centered at the leading edge of the expected horizontal synchronization pulse.

As shown in FIG. 4, at any given time within the detection window, the higher order 4 bits of the current 8-bit pixel is received from the output of an analog-to-digital converter ("A/D converter," not shown) on lead 405 into the phase detection circuit 301. Adder 406 sums this 4-bit quantity on lead 405 to a 4-bit quantity which is the delayed value of the higher order 4 bits of the second last pixel. This delayed value is provided by the cascaded registers 401 and 402 two pixels later. The summation at adder 406 is provided to eliminate from the phase error any contribution due to the color subcarrier signal of the pixels in the previous horizontal line received. This summation is necessary because the color subcarrier signal may sometimes dip below the blanking level. Since the present embodiment samples at four times the subcarrier signal rate, pixel samples of the color subcarrier separated by two pixels are 180 degrees out of phase. Therefore, summation of pixels sampled two pixels apart eliminates any contribution by the color subcarrier signal.

The 5-bit result on bus 410 of the summation at adder 406 is clipped by clipping circuit 403 to a 3-bit quantity on bus 407, corresponding to the lesser of the result on bus 410 and the value 6. Adder 408 accumulates the 3-bit quantities on bus 407 in register 404 over the duration of the detection window.

In the present embodiment, the blanking level has a value of 4, as represented in the 4 higher order bits from the A/D converter. Similarly, the sync level has a value of 0, as represented in the same four higher order bits received from the A/D converter. As a result, the threshold value used to detect the horizontal synchronization pulse is approximately 2. Since the value on bus 407 is limited to the value 6 by clipping circuit 403, ideally, if the horizontal synchronization pulse is detected at its nominal location, the total accumulated value over the detection window will be 210. This is because approximately half of the pixels will be detected at the blanking level, each rendering a value of 6 at bus 407 and approximately half of the pixels will be detected at the sync level, each rendering on bus 407 a value of 0, except at the transition of the horizontal synchronization pulse. The phase error d is indicated by the amount the accumulated phase value is less than or exceed 210. To obtain the phase error d directly, register 404 is loaded with the value −210 at the beginning of the detection window. The phase error d for the current horizontal line is provided to phase correction filter 302 on 9-bit bus 409.

Figure 5:
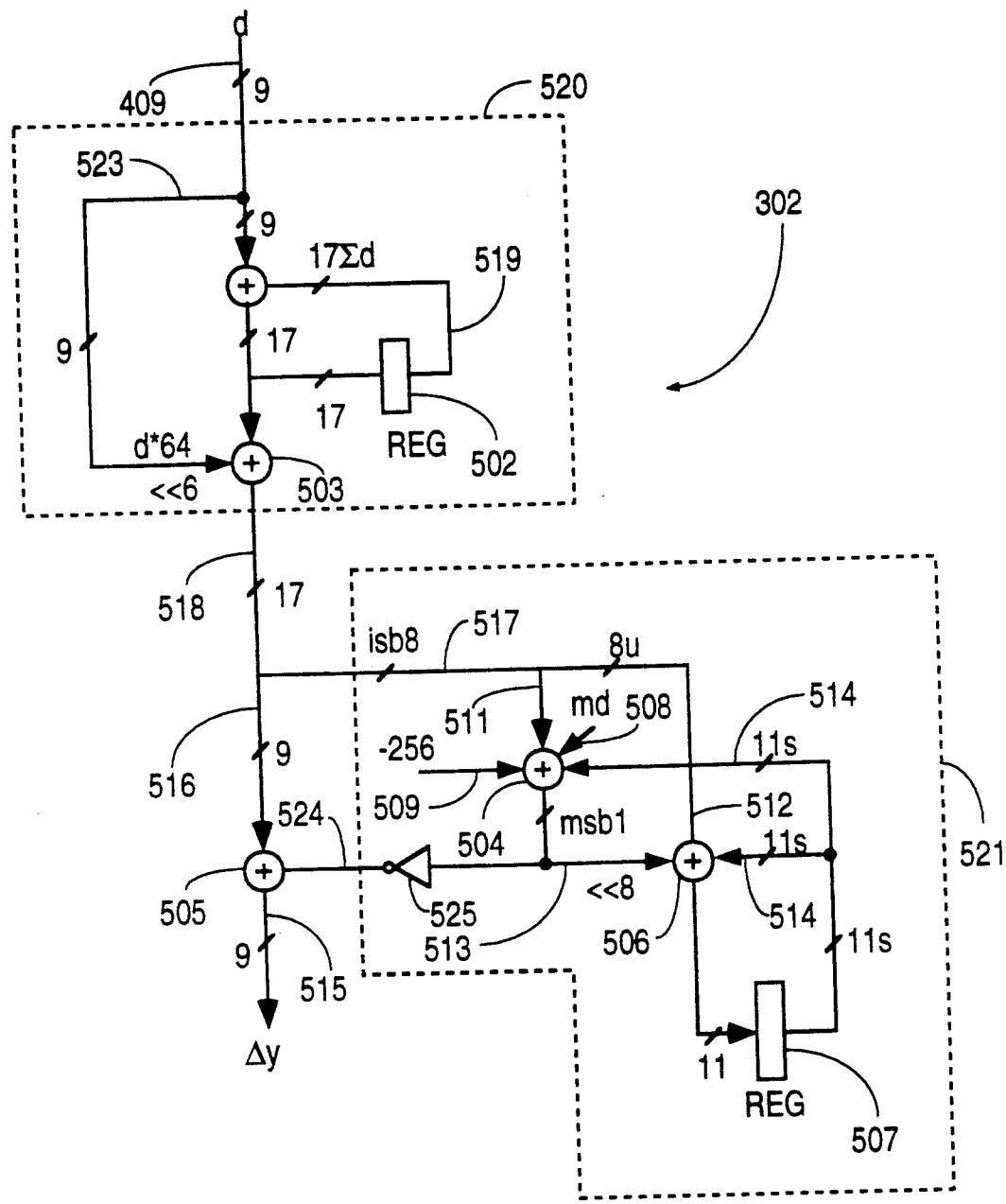
FIG. 5 shows phase correction filter 302, in accordance with the present invention.

Phase correction filter 302 is shown in FIG. 5. Together with the phase compensation circuit 303, phase correction filter 302 form a 3-pole filter. The first and third poles are shown in FIG. 5 as circuits 520 and 521. The second pole is the loop comprising the output value $\Delta y$ of phase correction filter 302 and the phase compensation circuit 303. The first pole (circuit 520) is designed to correct a systematic deviation from the nominal horizontal line frequency of 14.32 MHz (NTSC). This error occurs When the servomechanism of the VCR consistently fails to provide a horizontal synchronization signal every 910 pixels. The third pole (circuit 521) accumulates the round-off errors in the phase correction circuit 302. The second pole sums the phase corrections from all sources to provide the phase correction $\Delta y$ for the current horizontal line. In the present embodiment, the phase correction is provided in $\frac{1}{8}$ pixel units. A future improvement in the present embodiment may allow for sub-pixel phase compensation. In the present implementation, only full pixel compensations are provided.

As shown in FIG. 5, the phase error d of the current horizontal line is received into phase correction circuit 302 on 9-bit bus 409. This 9-bit value on bus 409 is added by adder 501 to a 17-bit value $\Sigma d$ accumulated in register 502. The result of this addition at adder 501 is stored as the updated $\Sigma d$ in register 502. Adder 503 adds the updated $\Sigma d$ to a value d*64 on bus 523. d*64 is the phase error d multiplied by 64. In this embodiment, d*64 is provided by shifting the phase error d by 6 bits. The 17-bit result of adder 503, provided as a 17-bit value on bus 518, is a weighted sum in which the ratio of the weights given to the current phase error d and the accumulated phase error $\Sigma d$ of the current frame's previous horizontal lines is 64 to 1. This weighted sum on bus 518, after being normalized and corrected for accumulated round-off errors (see below) is provided as the phase correction $\Delta y$ on bus 515.

Circuit 520 provides that, if the servomechanism yields horizontal lines at a frequency consistently higher or lower than the nominal frequency ("systematic phase error"), the accumulated phase error $\Sigma d$ will eventually dominate the weighted sum of adder 503. Ideally, a steady state will be reached, such that the accumulated phase error $\Sigma d$ corrects for the systematic phase error. For example, if the servomechanism consistently provides a 900-pixel horizontal line, rather than a 910-pixel horizontal line, the accumulated phase error will grow to a value in register 502 such that a phase correction ($\Delta y$) of 10 pixels will be provided on bus 515. At this steady state, with the 10 pixel correction provided, the systematic component of the phase error d between successive horizontal synchronization pulses is reduced to zero.

Because circuit 520 requires many cycles to reach steady state, circuit 520 does not respond to phase errors of a higher frequency. For example, a shift in phase which lasts for 2 or 3 horizontal lines ("random phase error") is not corrected in this embodiment through the accumulated phase error $\Sigma d$. Instead, the random phase error component in the phase error d is reflected in the contribution by the d*64 term on bus 523 to the weighted sum of adder 503. As discussed above, this weighted sum on bus 518 becomes the phase correction $\Delta y$ after being normalized and corrected for round-off errors. Thus, random phase error is primarily corrected by this second pole, which is formed by the path of bus 523, bus 516, bus 515, and phase compensation circuit 303.

In order to normalize the weighted sum on bus 518 to a value expressed in $\frac{1}{8}$ pixel units, the higher order 9-bits of the 17-bit result on bus 518 is provided on bus 516. This normalization step is equivalent to dividing the 17-bit weighted sum on bus 516 by 256. Significantly, this normalization step renders phase correction $\Delta y$ approximately one quarter of the phase error d. Consequently, in each horizontal line the amount of phase error compensated is roughly ¼ of the phase error d estimated. By not providing full phase compensation, an inertia is built into the phase correction filter 302. Such inertia dampens phase correction Δy's response to the random phase error component of phase error d, and thereby limits jittering in the resulting video image.

The lower order 8 bits of the 17-bit result on bus 518 constitute a round-off error which is accumulated by circuit 521. Adder 505 adds the value of bus 516 to a 1-bit value on bus 524. The 1-bit value on bus 524 is 1 when the accumulated round-off errors resulting from successive normalization steps exceed ½ pixel.

The round-off errors are accumulated in circuit 521 by adder 506 and stored in register 507 as a 11-bit quantity. Adder 504 is used to test if the accumulated value exceeds the value 256 (i.e. ½ pixel). This is accomplished by subtracting 256 from the sum of the 8-bit value on bus 514 and the accumulated errors on bus 514. When the result at adder 504 is positive (i.e. the most significant bit of the 11-bit result is 0), 256 is subtracted from the accumulated errors and a 1 is placed on bus 524 by inverter 525 to add 1 to phase correction Δy.

In the present embodiment, the sum at adder 504 includes the contribution on bus 508 of a 7-bit random number, which is provided to randomize the output of circuit 521. This randomization is desirable since the contribution by the accumulated round-off errors to the phase correction Δy tends to be periodic and thus is easily observed as a periodic horizontal line movement by the human observer. The result of a randomized phase correction by this third pole is more pleasing. In the present embodiment, the random number is generated by a conventional method using a group of recirculating shift registers and exclusive-OR gates. However, any conventional random number generator can be used for the purpose of the present invention.

In the present embodiment, the phase-compensated video signal is demodulated by the apparatus described in the aforementioned copending application Ser. No. 07/678,539.

The above detailed description is provided to illustrate the specific embodiments of the present invention and is not intended to be limiting. Numerous variations and modifications can be provided within the scope of the present invention. The present invention is defined by the following claims.

I claim:

1. A structure for providing an output signal which tracks a video signal, said video signal having a synchronization pulse for each line in an encoded image, comprising:
    means for tracking said video signal in a first mode of operation; and
    means for tracking said video signal in a second mode of operation, comprising:
        (i) a phase detector for detecting a phase error in said synchronization pulse of said video signal;
        (ii) a first circuit for providing a phase correction in response to said phase error; and
        (iii) a second circuit for compensating for said phase error providing said output signal as said video signal advanced or delayed by said phase correction.

2. A structure as in claim 1, wherein said first circuit provides said phase correction at a magnitude less than the magnitude of said phase error detected.

3. A structure as in claim 1, wherein said first circuit includes, in said phase correction, compensation for a systematic component in said phase error.

4. A structure as in claim 1, wherein said first circuit includes, in said phase correction, compensation for a random component in said phase error.

5. A structure as in claim 1, wherein said first circuit includes, in said phase correction, compensation for accumulated round-off errors in said phase correction.

6. A structure as in claim 1, wherein, under said second mode of operation, said structure is active for a predetermined number of lines in said encoded image of said video signal.

7. A structure for providing an output signal which tracks a video signal, said video signal having a synchronization pulse for each line in an encoded image, comprising:
    means for tracking said video signal in a first mode of operation; and
    means for tracking said video signal in a second mode of operation, comprising:
        (i) a phase detector for detecting a phase error in said synchronization pulse of said video signal;
        (ii) a first circuit for providing a phase correction in response to said phase error; and
        (iii) a second circuit for compensating for said phase error, by providing said output signal as said video signal advanced or delayed by said phase correction;
    wherein said phase detector detects said phase error by summing samples of said video signal over a time window including a transition of said synchronization pulse.

8. A structure for providing an output signal which tracks a video signal, said video signal having a synchronization pulse for each line in an encoded image, comprising:
    means for tracking said video signal in a first mode of operation; and
    means for tracking said video signal in a second mode of operation, comprising:
        (i) a phase detector for detecting a phase error in said video signal;
        (ii) a first circuit for providing a phase correction in response to said phase error; and
        (iii) a second circuit for compensating for said phase error, by providing as said output signal said video signal advanced or delayed by said phase correction;
    wherein said first circuit compensates for accumulated round-off errors in said phase correction using a random number generator to eliminate periodicity in said accumulated round-of errors.

9. A method for providing an output signal which tracks a video signal, said video signal having a synchronization pulse for each line in an encoded image, comprising the steps of:
    tracking said video signal in a first mode of operation; and
    tracking said video signal in a second mode of operation using a method comprising the steps of:
        (i) detecting a phase error in said synchronization pulse of said video signal;
        (ii) providing a phase correction in response to said phase error; and
        (iii) compensating for said phase error by providing said output signal as said video signal advanced or delayed by said phase correction.

10. A method as in claim 9, wherein said step of providing said phase correction provides said phase correction at a magnitude less than the magnitude of said phase error detected.

11. A method as in claim 9, wherein said step of providing a phase correction comprises the step of including, in said phase correction, compensation for a systematic component in said phase error.

12. A method as in claim 9, wherein said step of providing a phase correction comprises the step of including, in said phase correction, compensation for a random component in said phase error.

13. A method as in claim 9, wherein said step of providing a phase correction comprises the step of including, in said phase correct, compensation for accumulated round-off errors.

14. A method as in claim 9, wherein, under said second mode of operation, said method is active for a predetermined number of lines in said encoded image of said video signal.

15. A method for providing an output signal which tracks a video signal, said video signal having a synchronization pulse for each line in an encoded image, comprising the steps of:

tracking said video signal in a first mode of operation; and tracking said video signal in a second mode of operation using a method comprising the steps of:

(i) detecting a phase error in said synchronization pulse of said video signal;

(ii) providing a phase correction in response to said phase error; and (iii) compensating for said phase error by providing said output signal as said video signal advanced or delayed by said phase correction;

wherein said step of detecting a phase error detects said phase error by summing samples of said video signal over a time window including a transition of said synchronization pulse.

16. A method for providing an output signal which tracks a video signal, said video signal having a synchronization pulse for each line in an encoded image, comprising the steps of:

tracking said video signal in a first mode of operation; and tracking said video signal in a second mode of operation using a method comprising the steps of:

(i) detecting a phase error in said video signal;

(ii) providing a phase correction in response to said phase error; and (iii) compensating for said phase error by providing said output signal as said video signal advanced or delayed by said phase correction;

wherein said step of compensating includes compensation for accumulated round-off errors by providing random numbers to eliminate periodicity in said accumulated round-off errors.

* * * * *